United States Patent
Jury et al.

[19]

[11] Patent Number: 6,051,267
[45] Date of Patent: Apr. 18, 2000

[54] SCREW-EXTRUSION OF CHOCOLATE AND OTHER FAT-CONTAINING CONFECTIONERY MATERIALS

[75] Inventors: Mark Jury, Thirsk; John Howard Walker, Haxby, both of United Kingdom

[73] Assignee: Nestec S.A., Vevey, Switzerland

[21] Appl. No.: 08/823,602

[22] Filed: Mar. 25, 1997

[30] Foreign Application Priority Data

Mar. 26, 1996 [GB] United Kingdom .................... 9606285
Jul. 23, 1996 [GB] United Kingdom .................... 9615404

[51] Int. Cl.⁷ .................................................. A23G 7/00
[52] U.S. Cl. ............................................ 426/516; 426/660
[58] Field of Search .................................. 426/516, 660, 426/448; 425/278.1, 208

[56] References Cited

U.S. PATENT DOCUMENTS

| | | | |
|---|---|---|---|
| H1527 | 4/1996 | Moore | 426/660 |
| 1,628,251 | 5/1927 | Laskey | 426/516 |
| 1,649,307 | 11/1927 | Hunter | 426/516 |
| 2,246,871 | 6/1941 | Balch | 426/249 |
| 2,332,211 | 10/1943 | Field | 426/516 |
| 3,098,746 | 7/1963 | Noznick | 426/516 |
| 3,229,647 | 1/1966 | Von Drachenfels et al. | 426/306 |
| 3,265,508 | 8/1966 | Wurzburg | 426/515 |
| 3,265,509 | 8/1966 | Wurzburg | 426/515 |
| 3,265,510 | 8/1966 | Wurzburg | 426/515 |
| 3,307,503 | 3/1967 | Elmer, Jr. et al. | 426/516 |
| 3,946,803 | 3/1976 | Heitzer et al. | 165/87 |
| 4,010,284 | 3/1977 | Bellew | 426/285 |
| 4,118,164 | 10/1978 | Wenger et al. | 425/202 |
| 4,136,131 | 1/1979 | Buchanan | 260/816 G |
| 4,168,942 | 9/1979 | Firth | 425/144 |
| 4,185,123 | 1/1980 | Wenger et al. | 426/272 |
| 4,191,786 | 3/1980 | Nappen et al. | 426/593 |
| 4,199,611 | 4/1980 | Toyoshima et al. | 426/607 |
| 4,426,402 | 1/1984 | Kaupert | 426/515 |
| 4,563,358 | 1/1986 | Mercer et al. | 426/89 |
| 4,569,848 | 2/1986 | Giorgetti et al. | 426/94 |
| 4,689,236 | 8/1987 | Pinto | 426/502 |
| 4,713,256 | 12/1987 | Chaveron et al. | 426/631 |
| 4,744,993 | 5/1988 | Bisson et al. | 426/38 |
| 4,828,854 | 5/1989 | Beer | 426/104 |
| 4,837,041 | 6/1989 | Maruzeni et al. | 426/611 |
| 4,851,248 | 7/1989 | Simelunas et al. | 426/291 |
| 4,861,615 | 8/1989 | Wiedmann | 426/631 |
| 4,942,910 | 7/1990 | Hamamura | 141/9 |
| 4,965,082 | 10/1990 | Chawan et al. | 426/331 |
| 5,120,559 | 6/1992 | Rizvi et al. | 426/446 |
| 5,135,769 | 8/1992 | Itagaki et al. | 426/607 |
| 5,439,695 | 8/1995 | MacKey | 426/516 |
| 5,464,649 | 11/1995 | St. John et al. | 426/660 |
| 5,476,675 | 12/1995 | Lou et al. | 426/590 |
| 5,478,511 | 12/1995 | Foresman | 426/516 |
| 5,501,865 | 3/1996 | Zumbe et al. | 426/548 |

FOREIGN PATENT DOCUMENTS

| | | | |
|---|---|---|---|
| 994554 | 6/1965 | United Kingdom . | |
| 1491162 | 11/1977 | United Kingdom | B29F 3/06 |
| 2051656 | 1/1981 | United Kingdom | B29F 3/08 |
| 8301729 | 5/1983 | WIPO | A23L 1/76 |

OTHER PUBLICATIONS

Harper, "Extrusion of Foods: vol. I" pp. 5–19, 52, 58–60, 66, 1981.

Mercier et al, "Extrusion Cooking" pp. 1–11, 91–96, 1989.

*Primary Examiner*—Cynthia L. Nessler
*Attorney, Agent, or Firm*—Vogt & O'Donnell, LLP

[57] ABSTRACT

A chocolate or other fat-containing confectionery material is fed into and extruded from a screw extruder and the temperature of the extruder barrel wall and screw are controlled so that the material advanced through the extruder and the product from the die are non-pourable and so that the product is plastically deformable for a period of time, and in particular, the screw and barrel wall temperatures are controlled so that the screw has a temperature higher than the barrel wall temperature. Additionally, the material may be advanced within an extruder barrel wall which is roughened and the diameter of the screw root may increase in and along the direction of material advanced in the extruder.

31 Claims, 1 Drawing Sheet

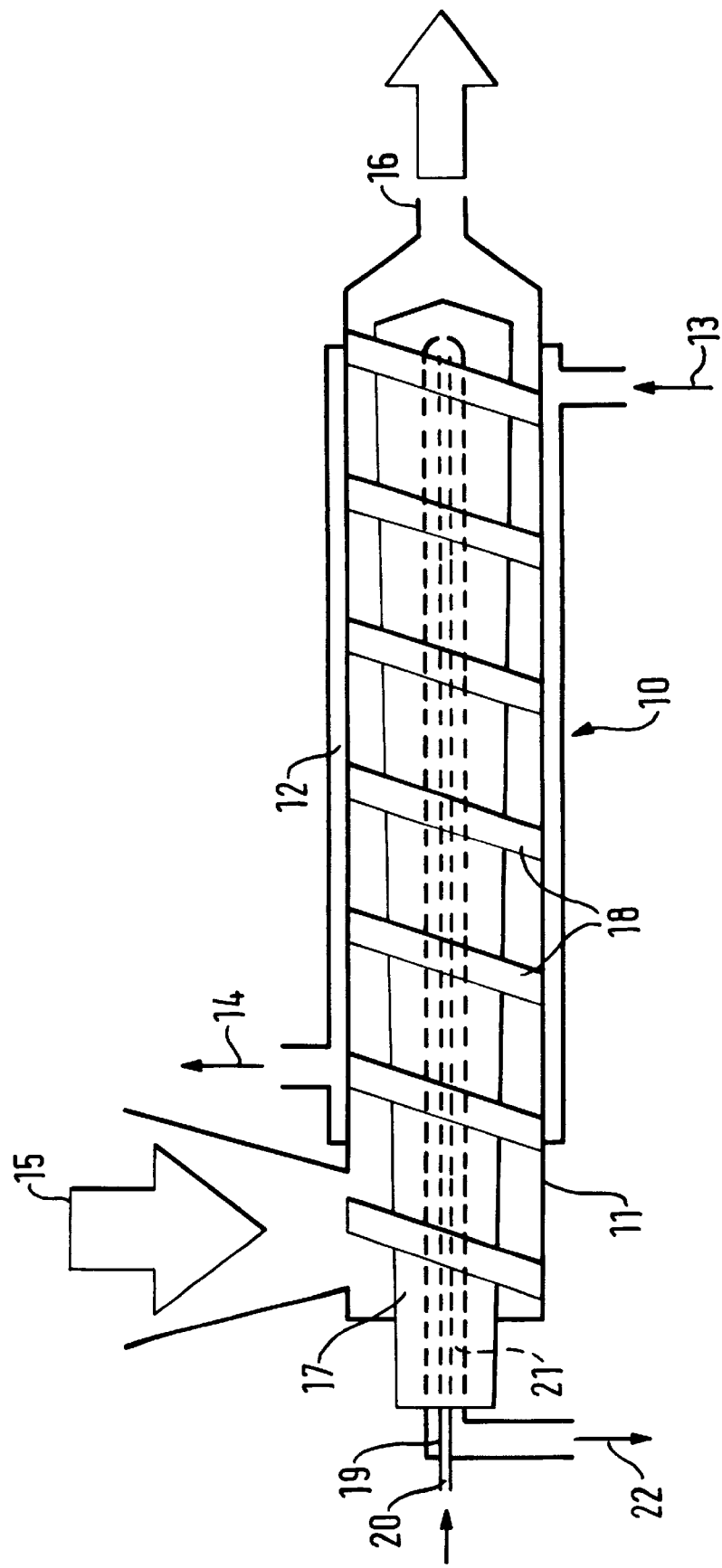

SCREW-EXTRUSION OF CHOCOLATE AND OTHER FAT-CONTAINING CONFECTIONERY MATERIALS

BACKGROUND OF THE INVENTION

The present invention relates to the extrusion of chocolate and other fat-containing confectionery materials and more particularly to a process for the continuous extrusion of solid or semi-solid chocolate and other fat-containing confectionery materials using a screw extruder.

In European Patent Application Publication No. 0 603 467, which sets forth the contents of Application No. 93114251.7, the entirety of which is hereby incorporated by reference, describes a process for plastically extruding a fat-containing confectionery material which comprises feeding the fat containing confectionery material into an extruder and applying pressure to the fat-containing confectionery material in a substantially solid or semi-solid nonpourable form upstream of a flow constriction whereby the temperature, pressure, contraction ratio and extrusion rate are such that the fat-containing confectionery material is extruded and remains in a substantially solid or semi-solid nonpourable form to produce an axially homogeneous extruded product having a cross section that is of substantially the same profile as the die exit of the extruder, which is capable of retaining its shape and which has a temporary flexibility, or plasticity, enabling it to be physically manipulated, cut or plastically deformed before losing its flexibility or plasticity.

The temporary flexibility of the extruded fat-containing confectionery material obtained in the process of the above-mentioned co-pending patent application may last for up to 4 hours or more, e.g. from 1 second or less to 2 hours, e.g. from 10 seconds to 1 hour. During this period of temporary flexibility, the extruded fat-containing confectionery material may be cut cleanly, and this is in contrast to fat-containing confectionery material extruded by a process as described in the afore-noted European '467 Application after the temporary flexibility has been lost, or to a normal set chocolate which has to be heated slightly for cutting which otherwise would shatter owing to its brittleness.

As described in the afore-noted European '467 Application, a chocolate or other fat-containing confectionery material may be fed into the barrel of an extruder in a liquid or paste form, but it preferably is fed into the barrel in a solid or semi-solid non-pourable form. The chocolate or fat-containing confectionery material may be in a granular or continuous form. When in granular form, the granular nature of the material appears to be lost during extrusion to give an essentially uniform material.

Additionally, it is described in the European '467 Application that during extrusion, it is important that the fat-containing confectionery material does not become pourable and that the extrusion temperature and pressure should be maintained below a level where this may happen. Additionally it is described that the extrusion pressure is partially dependent, amongst other things, on the contraction ratio, the extrusion temperature and the confectionery composition and may be from 1 to 1000 bars, e.g., from 5 to 500 bars and typically from 5 to 250 bars, and it is described that an important feature of the extrusion process is that for a given die configuration and material composition, the extrusion rate is weakly dependent upon the extrusion pressure.

The extrusion process may be carried out batchwise or continuously, and some examples of advantages of continuous extrusion are:

a) the extrusion rate is constant and uninterrupted, and b) coextrusion is simpler because the chocolate or fat-containing confectionery material is extruded at a constant rate, and c) continuous downstream cutting of the extruded flexible chocolate can be carried out in order to form sectioned pieces.

However, when carrying out continuous extrusion using a screw extruder, heat may be generated by the friction of the shear of the chocolate between the screw and the barrel wall. This heat tends to raise the temperature so that the chocolate melts, and the liquefied fat of the melted chocolate acts as a lubricant causing the chocolate to slip against the barrel wall which prevents it from extruding efficiently. It is important that the chocolate should stick sufficiently at the surface of the barrel wall and slip sufficiently at the surface of the extruder screw in order that the extruder can generate an extrusion pressure. It is equally important that the temperature at either surface is not sufficiently high to cause substantial melting of the chocolate.

SUMMARY OF THE INVENTION

We have found that, by careful control of the temperature of the barrel wall and of the screw, we can ensure that the chocolate or other fat-containing confectionery material of the present invention remains in a substantially solid or semi-solid state with a suitable degree of slippage against the screw enabling an efficient extrusion through the barrel.

According to the present invention, there is provided a process for the continuous extrusion of chocolate or a fat-containing confectionery material using a screw extruder which comprises feeding the chocolate or fat-containing confectionery material into the screw extruder and generating a pressure to force the chocolate or fat-containing confectionery material in a substantially solid or semi-solid nonpourable form upstream of a flow constriction whereby the temperature of the screw, the temperature of the barrel wall, the screw speed, pressure, contraction ratio and extrusion rate are such that the chocolate or fat-containing confectionery material is extruded in a substantially solid or semi-solid nonpourable form to produce an axially homogeneous extruded product, i.e., an extrudate, having a cross section that is of substantially the same profile as the die exit of the extruder, which is capable of retaining its shape and which has a temporary flexibility, or plasticity, enabling it to be physically manipulated, cut or plastically deformed before losing its flexibility or plasticity.

DETAILED DESCRIPTION OF THE INVENTION

In carrying out the process of the present invention, a chocolate material employed may be dark, milk or white chocolate. Fat containing confectionery materials may include sugar, milk derived components, and fat and solids from vegetable or cocoa sources in differing proportions having a moisture content less than 10%, more usually less than 5% by weight. They may be chocolate substitutes containing direct cocoa butter replacements, stearines, coconut oil, palm oil, butter or any mixture thereof; nut pastes such as peanut butter and fat; praline; confectioner's coatings used for covering cakes usually comprising chocolate analogues with cocoa butter replaced by a cheaper non-tempering fat; or CARAMAC sold by Nestle comprising non-cocoa butter fats, sugar and milk.

The temperature of the screw may be controlled, for instance, by a fluid such as water at the appropriate temperature flowing through the interior of the screw. For example, the fluid may enter at the upstream end and flow to the downstream end through one or more longitudinal channels and return through one or more longitudinal channels to the upstream end where it exits. The temperature of the barrel wall may be controlled, for instance, by a fluid such as water or glycol or a mixture thereof at the appropriate temperature flowing through a jacket surrounding the barrel wall.

The temperatures of the screw and the barrel wall may be controlled according to the type of fats present in the material being extruded. For example, fats having higher melting points usually require a warmer barrel wall and screw than fats having lower melting points. The degree of flexibility of the extruded product may be affected by the temperature and the melting point of the fats present in the material being extruded.

With regard to the screw temperature, if the temperature is too low, the chocolate will adhere to the screw and will not advance along the screw, whereas if the temperature is too high, the chocolate melts causing blockages. Depending on the type of fats present in the material being extruded, the temperature of the screw may be from 10° to 35° C., and more usually from 15° to 30° C.

With regard to the barrel wall temperature, if the temperature of the barrel wall is too high, the chocolate may melt and slip against the wall and may not extrude efficiently. Depending on the type of fats present in the material being extruded, the temperature of the barrel wall may be from −50° to +20° C., more usually from −25° to +15° C. Often, the temperature of the barrel wall may conveniently be lower than the incoming chocolate or fat-containing confectionery material but, in some circumstances, the temperature of the barrel wall may be higher than the incoming chocolate or fat-containing confectionery material. The slippage of the fat-containing confectionery material against the barrel wall may also be reduced by roughening the barrel wall, e.g. by rifling such as forming longitudinal or spiral grooves in the wall. The spiral grooves preferably run in the opposite direction to the pitch of the screw and preferably have a longer pitch than that of the screw.

Conveniently, the temperature of the screw is greater than the temperature of the barrel wall, for instance, by from 5° to 50° C., preferably from 10° to 40° C. and more preferably from 12° to 30° C.

In one advantageous embodiment the diameter of the screw root increases from the upstream to the downstream end while the pitch remains constant. In another advantageous embodiment the pitch of the screw decreases from the upstream to the downstream end while the diameter of the screw root remains constant.

The compression ratio of the screw may be from 1:1 to 5:1 and preferably from 1.5:1 to 3:1. Compression ratios above 5:1 may cause blockages of the material being extruded. The ratio of length to diameter of the screw may be, for instance, from 5:1 to 30:1 and preferably from 10:1 to 25:1.

The diameter of the screw may be, for example from 20 to 500 mm. The screw speed may be, for example, from 1 to 500 rpm. The actual screw diameter and screw speed may be selected by the person skilled in the art according to the requirements. The throughput depends on the screw speed and may be, for instance, from 1 to 5000 kg/hr according to requirements.

As also described in the afore-noted European '467 Application, the sectional geometry of the die may be of a square or profiled form. Typically, it might be a conical entry with an inlet cone angle of from 10° to 90°. The flow rate of the chocolate through the extruder die will depend amongst other things on extrusion pressure, temperature, die configuration and material formulation. Extrusion rates may vary from 0.1 cm/second to in excess of 1 meter/second, for instance.

A wide variety of die shapes may be used and the extruded fat-containing confectionery material may have a solid, profiled or hollow section and essentially has the same shape as the die, e.g. rods, spirals, twists, springs, hollow sections such as tubes and more complex shapes such as the letters of the alphabet as well as thin films having a thickness which may be as little as 100 microns. The dimensions of the die depend on the desired size of the extruded product.

If desired, two or more fat-based confectionery materials may be extruded in accordance with the process of the present invention. In addition, the chocolate or fat-containing confectionery material may be co-extruded with other food materials such as ice cream, sorbet, yoghurt, mousse, fondant, praline, marshmallow, nougat or jelly, etc., such being advantageous when the fat-containing confectionery material is extruded in a hollow or tubular form. Hence, in such embodiments, a multi-orifice die and/or associated equipment, as are known to those skilled in the art, may be employed.

If desired, a twin screw extruder may be used and may be either one using counter-rotating screws or one using co-rotating screws.

The temperature of the chocolate or fat-containing confectionery material as it is extruded may conveniently be from 15° to 28° C., more usually from 18 to 25° C., e.g. from 20° to 23° C.

The present invention is further described by way of example only with reference to the accompanying drawing.

BRIEF DESCRIPTION OF THE DRAWING FIGURE

The accompanying drawing FIGURE schematically illustrates a continuous extrusion system for practice of the present invention.

DETAILED DESCRIPTION OF THE DRAWING FIGURE

Referring to the accompanying drawing FIGURE, the extruder generally designated 10 comprises a barrel 11 provided with a cooling jacket 12 having an inlet for cooling fluid 13 and an outlet for cooling fluid 14, an inlet for the feed material to be extruded 15, a die 16 having a circular cross-section and a diameter of 6.5 mm, and a screw 17 whose root diameter increases from the upstream end to the downstream end and which is provided with threads 18 whose pitch is constant from the upstream end to the downstream end. The screw 17 is provided with a channel 19 for heating fluid which extends from the upstream end to the downstream end and has an inlet 20 connected with a concentric channel 21 which leads to an outlet for the heating fluid 22.

EXAMPLES

The operation of the above described single screw extruder is described in the following Examples.

Example 1

Milk chocolate buttons having a temperature of 22° C. are fed into the barrel 11 of the extruder 10 through the feed inlet 15. The screw 17 has a diameter of 32 mm, a length to diameter ratio of 24:1, a 2:1 compression ratio and a screw speed of 65 rpm. A 50:50 mixture of water and glycol at −5° C. flows through the cooling jacket 12 of the barrel and water at 20° C. flows through the channels 19 and 21 of the screw. As the screw rotates, the solid chocolate advances at a rate of 15 kg/hr and is extruded through the die 16 with a configuration conforming to that of the die and has a temporary flexibility which lasts for about 1 hour.

Example 2

Milk chocolate buttons having a temperature of 22° C. are fed into the barrel 11 of the extruder 10 through the feed inlet 15. The screw 17 has a diameter of 50 mm, a length to diameter ratio of 20:1, a 2:1 compression ratio and a screw speed of 70 rpm. A 50:50 mixture of water and glycol at −10° C. flows through the cooling jacket 12 of the barrel and water at 25° C. flows through the channels 19 and 21 of the screw. As the screw rotates, the solid chocolate advances at a rate of 50 kg/hr and is extruded at 21° C. through the die 16 with a configuration conforming to that of the die and has a temporary flexibility which lasts for about 1 hour.

Example 3

Milk chocolate buttons having a temperature of 22° C. are fed into the barrel 11 of the extruder 10 through the feed inlet 15. The screw 17 has a diameter of 90 mm, a length to diameter ratio of 15:1, a 2:1 compression ratio and a screw speed of 35 rpm. Water at 5° C. flows through the cooling jacket 12 of the barrel and water at 20° C. flows through the channels 19 and 21 of the screw. As the screw rotates, the solid chocolate advances at a rate of 280 kg/hr and is extruded through the die 16 with a configuration conforming to that of the die and has a temporary flexibility which lasts for about 1 hour.

We claim:

1. In a process for preparing a food article wherein a chocolate or other fat-containing confectionery material is fed into a screw extruder which comprises a screw comprising a screw root from which screw threads extend at a pitch and which comprises a barrel wall which contains the screw and wherein the screw is rotated to apply pressure to the material to advance the material within the barrel wall through the extruder and to and through an extruder flow-constriction and die to obtain an extrudate from the die so that the material advanced through the extruder and so that the extrudate from the die are in a non-pourable state and so that the material advanced to the die plastically deforms and so that the extrudate is plastically deformable for a period of time, an improvement comprising controlling a temperature of the screw and a temperature of the barrel wall so that the screw temperature is higher than the barrel wall temperature for controlling material and extrudate temperature so that the material advanced through the extruder and so that the extrudate from the die are in the non-pourable state and so that the material advanced to the die is deformed plastically and so that the extrudate is plastically deformable for the period of time.

2. A process according to claim 1 wherein the material is selected from the group consisting of a chocolate, of a chocolate substitute comprising a cocoa butter replacement and of a chocolate analog comprising a cocoa butter replacement.

3. A process according to claim 1 wherein in and along a direction of material advance, the screw thread pitch decreases and wherein a diameter of the root is constant.

4. A process according to claim 1 wherein the screw temperature is controlled with a fluid flowing through an interior of the screw and wherein the barrel wall is jacketed with a jacket and the barrel wall temperature is controlled by a fluid flowing through the jacket.

5. A process according to claim 1 wherein the screw is rotated at from 1 rpm to 500 rpm.

6. A process according to claim 1 wherein the screw has a compression ratio of from 1:1 to 5:1.

7. A process according to claim 1 wherein the screw has a length to diameter ration of from 5:1 to 30:1.

8. A process according to claim 7 wherein the screw has a diameter of from 20 mm to 500 mm.

9. A process according to claim 1 wherein the screw and barrel wall temperatures are controlled so that the screw temperature is greater than the barrel wall temperature in an amount of from 5° C. to 50° C.

10. A process according to claim 9 wherein the screw and barrel wall temperatures are controlled so that the screw has a temperature of from 10° C. to 35° C. and the barrel wall has a temperature of from −50° C. to +20° C.

11. A process according to claim 1 wherein the barrel wall is roughened so that the material advances within the roughened barrel wall.

12. A process according to claim 11 wherein the material is selected from the group consisting of a chocolate, of a chocolate substitute comprising a cocoa butter replacement and of a chocolate analog comprising a cocoa butter replacement.

13. A process according to claim 11 wherein the screw temperature is controlled with a fluid flowing through an interior of the screw and wherein the barrel wall is jacketed with a jacket and the barrel wall temperature is controlled by a fluid flowing through the jacket.

14. A process according to claim 11 wherein in and along a direction of material advance, the screw thread pitch decreases and wherein a diameter of the root constant.

15. A process according to claim 11 wherein the screw has a compression ratio of from 1:1 to 5:1.

16. A process according to claim 11 wherein the screw is rotated at from 1 rpm to 500 rpm.

17. A process according to claim 11 wherein the screw has a length to diameter ratio of from 5:1 to 30:1.

18. A process according to claim 17 wherein the screw has a diameter of from 20 mm to 500 mm.

19. A process according to claim 11 wherein the screw and barrel wall temperatures are controlled so that the screw temperature is greater than the barrel wall temperature in an amount of from 5° C. to 50° C.

20. A process according to claim 19 wherein the screw and barrel wall temperatures are controlled so that the screw has a temperature of from 10° C. to 35° C. and the barrel wall has a temperature of from −50° C. to +20° C.

21. A process according to claim 1 wherein a further improvement comprises rotating the screw to apply pressure to the material to advance the material in a direction to the flow constriction and die wherein in and along the direction of material advance, a diameter of the root increases.

22. A process according to claim 21 wherein the material is selected from the group consisting of a chocolate, of a chocolate substitute comprising a cocoa butter replacement and of a chocolate analog comprising a cocoa butter replacement.

23. A process according to claim 1 wherein the screw temperature is controlled with a fluid flowing through an interior of the screw and wherein the barrel wall is jacketed with a jacket and the barrel wall temperature is controlled by a fluid flowing through the jacket.

24. A process according to claim 21 wherein the barrel wall is roughened so that the material advances within the roughened barrel wall.

25. A process according to claim 21 wherein in and along the direction of material advance, the screw thread pitch is constant.

26. A process according to claim 21 wherein the screw has a compression ratio of from 1:1 to 5:1.

27. A process according to claim 21 wherein the screw is rotated at from 1 rpm to 500 rpm.

28. A process according to claim 21 wherein the screw has a length to diameter ratio of from 5:1 to 30:1.

29. A process according to claim 28 wherein the screw has a diameter of from 20 mm to 500 mm.

30. A process according to claim 21 wherein the screw and barrel wall temperatures are controlled so that the screw temperature is greater than the barrel wall temperature in an amount of from 5° C. to 50° C.

31. A process according to claim 30 wherein the screw and barrel wall temperatures are controlled so that the screw has a temperature of from 10° C. to 35° C. and the barrel wall has a temperature of from −50° C. to +20° C.

* * * * *